United States Patent [19]

Hashimoto et al.

[11] Patent Number: 4,726,815
[45] Date of Patent: Feb. 23, 1988

[54] PROCESS FOR ADSORBING AND SEPARATING CARBON DIOXIDE FROM GAS MIXTURE

[75] Inventors: Kiyoshi Hashimoto; Takumi Kono, both of Himeji; Makoto Kurimoto, Niihama; Masaru Uno, Akashi, all of Japan

[73] Assignees: Sumitomo Chemical Company, Limited, Osaka; Seitetsu Kagaku Co., Ltd., Harimachi, both of Japan

[21] Appl. No.: 938,240

[22] Filed: Dec. 5, 1986

[30] Foreign Application Priority Data

Dec. 10, 1985 [JP] Japan ............................ 60-278590

[51] Int. Cl.$^4$ .................................................. B01D 53/04
[52] U.S. Cl. ........................................... 55/23; 55/26; 55/27; 55/31; 55/33; 55/58; 55/75
[58] Field of Search .............................. 55/23, 25–27, 55/31, 33, 58, 62, 68, 74, 75

[56] References Cited

U.S. PATENT DOCUMENTS

| | | | |
|---|---|---|---|
| 3,266,221 | 8/1966 | Avery | 55/58 |
| 3,659,400 | 5/1972 | Kester | 55/58 X |
| 3,751,878 | 8/1973 | Collins | 55/58 |
| 3,891,411 | 6/1975 | Meyer | 55/26 |
| 4,380,457 | 4/1983 | Rathborne et al. | 55/33 |
| 4,472,178 | 9/1984 | Kumar et al. | 55/25 |

FOREIGN PATENT DOCUMENTS

| | | | |
|---|---|---|---|
| 3348 | 1/1980 | Japan | 55/23 |
| 56-26121 | 2/1984 | Japan . | |
| 59-173116 | 10/1984 | Japan . | |
| 2171927 | 9/1986 | United Kingdom | 55/25 |

Primary Examiner—Robert Spitzer
Attorney, Agent, or Firm—Stevens, Davis, Miller & Mosher

[57] ABSTRACT

Carbon dioxide can be obtained in high recovery with high purity from a gas mixture containing 10% or more of carbon dioxide by a pressure-swing adsorption method wherein moisture in the gas mixture is removed with cooling and heating prior to the adsorption of the carbon dioxide on an adsorbent.

8 Claims, 2 Drawing Figures

PROCESS FOR ADSORBING AND SEPARATING CARBON DIOXIDE FROM GAS MIXTURE

BACKGROUND OF THE INVENTION

This invention relates to a process for separating carbon dioxide from a gas mixture by using an adsorbent. More particularly, this invention relates to an improved process for separating and purifying carbon dioxide by a pressure-swing adsorption method (hereinafter referred to as "PSA method").

In a process for separating carbon dioxide by selectively adsorbing a carbon dioxide component in a gas mixture using an adsorbent containing carbon, purging the adsorbent zone with desorbed carbon dioxide and desorbing the carbon dioxide as disclosed in Published Unexamined Japanese patent application No. 59-173116, a pretreating equipment (e.g. an impurity removing equipment) is provided when impurities such as sulfur, and the like which deteriorate the adsorbent are present in the gas mixture used as raw material gases. But there usually have been no attention to moisture content, so that no water removal step is provided.

The present inventors found that in a process for adsorbing and separating carbon dioxide from a gas mixture by using the PSA method, when the gas mixture was supplied to an adsorbent in a wet gas state, the moisture was adsorbed on a part of the adsorbent to reduce the effective pore area of the adsorbent for the aimed gas component, which resulted in reducing the amounts of adsorption and desorption, lowering the recovery and lowering the purity of the product. This tendency is remarkable when the moisture content in the gas mixture, that is the dew point, becomes higher.

On the other hand, the gas mixture supplied as raw material gases is usually wet gases in a saturated state at the temperature supplied. It is a very rare case that the gas mixture is dry without pretreatment.

Further, the present inventors found that when the adsorption and desorption were conducted under ambient temperatures, there took place undesirably deviations in adsorption and desorption ability (the recovery, the purity of product, etc.) due to deviations of the ambient temperature.

SUMMARY OF THE INVENION

It is an object of this invention to provide a process for adsorbing and separating carbon dioxide from a gas mixture overcoming the disadvantages of prior art processes to yield carbon dioxide with high recovery and high purity and to carry out the process stably.

This invention provides a process for adsorbing and separating carbon dioxide from a gas mixture by PSA method comprising adsorbing a carbon dioxide component on an adsorbent from a gas mixture having a higher dew point, purging adsorbent zone with a purge gas and desorbing the carbon dioxide, characterized in that prior to supplying the gas mixture to the adsorbent the moisture in the gas mixture is removed with cooling so as to make the dew point 5° to 20° C. under an atmospheric pressure, and the gas mixture is heated.

DESCRIPTION OF THE PREFERRED EMBODIMENTS

Figure 1:
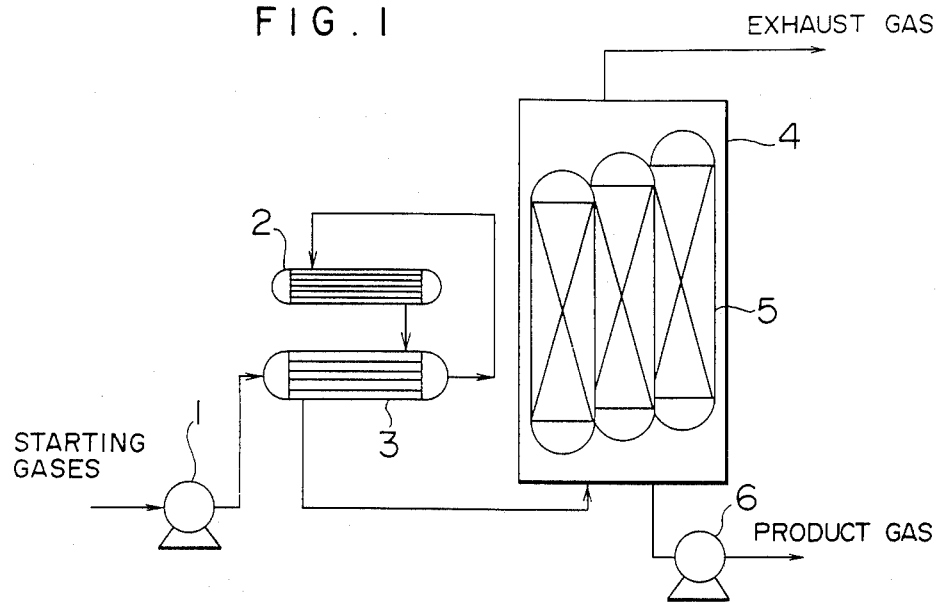
FIG. 1 is a schematic flow chart of an apparatus used in one embodiment of this invention comprising a pretreating means including a gas cooler (wherein the gas is cooled and a moisture in the gas is removed) and a heat exchanger for heating a gas, and a PSA apparatus including an adsorption tower.

The process of this invention is characterized by removing the moisture in a gas mixture used as raw material gases having a high dew point by passing the gas mixture through a gas cooler for removing moisture and heating the gas mixture prior to supplying the gas mixture to an adsorbent tower.

One example of steps in the process for separating and purifying carbon dioxide comprising adsorbing selectively a carbon dioxide component on an adsorbent from a gas mixture containing moisture, and desorbing the carbon dioxide under reduced pressure is as follows:

I. A pretreatment step comprising removing the moisture in the gas mixture containing moisture by passing the gas mixture through a gas cooler for removing moisture, and heating the gas mixture in a heat exchanger for raising the temperature of the gas mixture.

II. An adsorption step comprising introducing the gas mixture after the pretreatment into an adsorbent tower and adsorbing the carbon dioxide component on the adsorbent.

III. A purging step comprising introducing a portion of desorbed carbon dioxide from another adsorbent tower into the adsorbent tower in order to purge unnecessary gas components.

IV. A desorption step comprising desorbing the carbon dioxide component adsorbed on the adsorbent and recovering a part of desorbed carbon dioxide as a product and recycling residual desorbed carbon dioxide as the purge gas.

As the gas mixture used as raw material gases, there can usually be used a gas mixture containing 10% by volume or more of carbon dioxide ($CO_2$). Concretely, there can be used a blast furnace gas, a converter gas, a hot blast stove flue gas, generated in iron mills, and the like. The pressure of the starting gas mixture supplied to the moisture removal step is preferably from an atmospheric pressure to 1 Kg/cm$^2$ G.

In order to obtain high adsorption and separation ability, it is preferable to make the dew point of moisture as low as possible. But when the dew point is lowered gradually and reached at a certain temperature or lower, the adsorption and separation ability does not change significantly and an effect corresponding to the lowering of the dew point is not obtained. In this invention, the adsorption of $CO_2$ is conducted at a temperature of about 20° to 40° C. The removal of moisture from the gas mixture is conducted so long as the moisture is not frozen, preferably conducted so as to obtain a dew point of about 5° to 20° C., preferably 10° to 15° C., lower than the adsorption temperature. Such a dew point ranges 5° to 20° C. under an atmospheric pressure. When the dew point is lower than 5° C., there is a fear of freezing the gas cooler for removing moisture and being obliged to stop the operation. And also the moisture removing cost becomes undesirably high. On the other hand, when the dew point is higher than 20° C., both the purity and recovery of the product $CO_2$ are worsened undesirably.

In the case of adsorption of a gas by an adsorbent, there is a tendency, in general, to increase the adsorption amount with a decrease of the adsorption temperature and to decrease the adsorption amount with an increase of the adsorption temperature. In contrast, there is a tendency to increase the desorption amount with an increase of the desorption temperature. In the case of PSA method, the present inventors have found that the higher the adsorption and the desorption temperatures become, the higher the recovery of $CO_2$ becomes. Therefore, after removing the moisture in the gas cooler, the gas mixture is heated to the adsorption temperature (usually 20° to 40° C.) in a gas heat exchanger preferably by the heat exchange with the starting gas mixture.

As the carbon dioxide component to purge unnecessary gas components, a portion of desorbed gas from another adsorbent is usually used, and it is usually saturated with water under the desorbed state. Thus the moisture in the gas for purging is preferably removed with cooling so as to make the dew point 5° to 40° C. under an atmospheric pressure. A higher content of the moisture in the gas for purging compared with that in the raw material gases is allowable, because the volume of the gas fed to the adsorbent for purging is less than that of the raw material gases.

As the adsorbent used in the PSA apparatus, there can be used active carbon, molecular sieving active carbon, and the like.

The adsorbent is packed in a tough tower or a tank. The amount of adsorbent and the height of adsorbent layer can be decided depending on the amount of treated gas mixture, the flow rate of the gas mixture in the adsorption tower or tank, and the like.

The adsorption is conducted by introducing the gas mixture into an adsorbent layer so as to sufficiently adsorb the desired carbon dioxide component. After the adsorption, the residual gas mixture is removed out of the adsorption tower. Generally speaking, the adsorption amount increases when the pressure difference between an adsorption pressure and a desorption pressure becomes larger. Further, there is a tendency to increase the adsorption amount with a lowering in the adsorption temperature.

The desorption is conducted by reducing the pressure on the adsorbent which has sufficiently adsorbed the desired carbon dioxide component to separate the carbon dioxide from the adsorbent and to recover as the desorption gas outside the adsorption tower. The desorption is conducted under almost the same temperature of adsorption.

The adsorption tower is usually in a vertically cylindrical form. The gas mixture as raw material gases is supplied from an inlet at the bottom of the adsorption tower and removed from an outlet at the top of the adsorption tower after the adsorption. On the other hand, the desorbed gas is removed from the inlet at the bottom of the adsorption tower.

Pressures employed for the adsorption, purging and desorption are from about atmospheric pressure to 1 Kg/cm² G, preferably from atmospheric pressure to 0.2 Kg/cm² G, in the adsorption step, in the gas purging step, and about 50 Torr or higher, preferably 50 Torr to 100 Torr in the desorption step.

The process of this invention is explained in detail referring to FIG. 1, which is a schematic flow chart of an apparatus used in this invention. In FIG. 1, numeral 1 denotes a suction blower for supplying the gas mixture as raw material gases, numeral 2 a gas cooler for removing moisture from the gas mixture, numeral 3 a gas heat exchanger for raising the temperature of the cooled gas mixture to the adsorption temperature, numeral 4 a PSA apparatus, numeral 5 an adsorption tower installed in the PSA apparatus, numeral 6 a vacuum pump for desorbing the carbon dioxide adsorbed on the adsorbent.

The raw material gas mixture is introduced into the gas heat exchanger 3 through the suction blower 1. In the gas heat exchanger 3, heat exchange between the gas mixture cooled in the gas cooler 2 and the raw material gas mixture is conducted to heat the cooled gas mixture. The raw material gas mixture is, then, passed to the gas cooler 2 for removing moisture for cooling and moisture removal. Then, the gas mixture is passed through the gas heat exchanger 3 for a temperature rise and passed to the PSA apparatus. In the PSA apparatus, $CO_2$ is adsorbed on the adsorbent and the residual gas mixture is taken out as an exhaust gas. On the other hand, the adsorbed $CO_2$ is desorbed under reduced pressure by operating the vacuum pump 6 to yield pure $CO_2$ as product gas.

Figure 2:
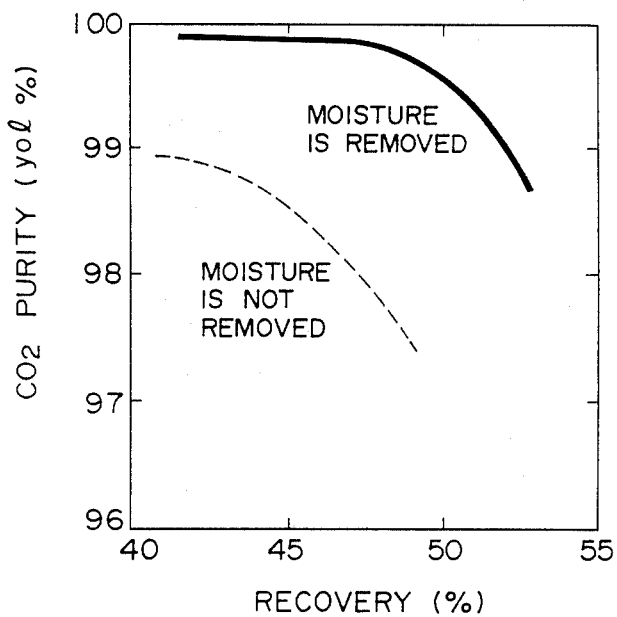
FIG. 2 is a graph showing a relationship between the recovery and the purity of $CO_2$ in the presence or absence of moisture.

FIG. 2 is a graph showing an influence of the moisture in a gas mixture containing $CO_2$ and $N_2$ on the purity and recovery of $CO_2$ when the adsorption and the separation is conducted at ambient temperatures (about 25° C.). The solid line shows the case when the moisture is removed before the adsorption (a dew point 10° C.) and the dotted line shows the case when the moisture is not removed (a dew point 27° C.).

The recovery is defined by the following equation:

$$\text{Recovery} = \frac{\left(\begin{array}{c}\text{Amount of}\\\text{product gas}\end{array}\right) \times \left(\begin{array}{c}CO_2\\\text{purity}\end{array}\right)}{\left(\begin{array}{c}\text{Used amount of}\\\text{raw material gases}\end{array}\right) \times \left(\begin{array}{c}CO_2 \text{ con-}\\\text{centration}\end{array}\right)} \times 100\ (\%)$$

As is clear from FIG. 2, when the moisture is removed from the gas mixture before the adsorption of $CO_2$, the recovery and the purity of product gas $CO_2$ are remarkably excellent compared with the case of removing no moisture.

This invention is illustrated by way of the following Examples.

EXAMPLE 1

As a starting gas mixture was used a gas mixture comprising 28% by volume of $CO_2$ and 72% by volume of $N_2$ (moisture saturated at 30° C.). $CO_2$ was separated and purified using a PSA apparatus comprising an adsorption tower (inside diameter: 40 mm, length: 500 mm) packed with 730 ml of molecular sieving active carbon (manufactured by Bergwerksverband GmbH in West Germany), a moisture removing device (refrigerating gas dryer), a vacuum pump for desorption and switch valves.

The starting gas mixture was introduced into the moisture removing device to remove moisture in the starting gas so as to make the dew point 5° C. Subsequently, 20 liters of the moisture-removed gas mixture was supplied and adsorbed for 120 seconds at atmospheric pressure. Then, 11.5 liters of a purging gas ($CO_2=100\%$ by volume) was supplied for 120 seconds at atmospheric pressure to conduct purging. Next, vacuum desorption was carried out using the vacuum pump by reducing the pressure from atmospheric pressure to 50 Torr over 240 seconds. The adsorption and desorption were carried out at about 20° C.

The above-mentioned process was repeated for the cases of dew points of 10° C., 20° C. and 30° C., respectively, provided that the desorption temperature was about 30° C. in the case of the dew point of 30° C.

Table 1 shows average values of the $CO_2$ purities of gases desorbed and amounts of gases desorbed.

TABLE 1

| Dew point (°C.) | Amount of gas desorbed (l) | $CO_2$ purity of gas desorbed (vol %) |
| --- | --- | --- |
| 5 | 12.66 | 99.29 |
| 10 | 12.54 | 99.27 |
| 20 | 12.62 | 97.88 |
| 30 | 10.20 | 94.70 |

EXAMPLE 2

As a starting gas mixture was used a hot blast stove exhaust gas ($CO_2$=28 vol %, $N_2$=71 vol %, $O_2$=1 vol %, moisture saturated at 27° C.) produced from an iron mill. $CO_2$ was separated and purified using the equipment shown in FIG. 1 comprising a PSA apparatus having three adsorption towers each packed with 163 liters of molecular sieving active carbon (manufactured by Bergwerksverband GmbH in West Germany), and a pretreatment device including a gas cooler and a heat exchanger for raising the temperature of gas.

The starting gas mixture was introduced through the suction blower 1 into the gas heat exchanger 3. In this gas heat exchanger 3, heat exchange was conducted between the gas cooled in the gas cooler 2 and the starting gas mixture to raise the temperature of the cooled gas to 30° C. Subsequently, the gas mixture was introduced into the gas cooler 2 to remove moisture so as to make the dew point 10° C. Next, the gas mixture was introduced into the gas heat exchanger 3 to raise the temperature of the gas mixture, which was then introduced into the PSA apparatus.

The adsorption was carried out for 150 seconds at atmospheric pressure. After purging for 150 seconds with desorbed carbon dioxide, the vacuum desorption was carried out by reducing the pressure to 60 Torr using the vacuum pump 6. Among $CO_2$ desorbed under reduced pressure, that obtained under a pressure of from 290 Torr to 150 Torr was recovered as a product. The adsorption and desorption were carried out at about 26° C.

The amount of the starting gas mixture supplied was 100 $Nm^3$/hr, the $CO_2$ purity of product gas was 99.9% by volume, the recovery of the product was 47.3%, and the amount of the product obtained was 13.24 $Nm^3$/hr.

COMPARATIVE EXAMPLE 1

The process of Example 2 was repeated except for separating and purifying $CO_2$ using moisture saturated gas at 27° C. without removing the moisture using the pretreatment device.

The amount of the starting gas mixture supplied was 100 $Nm^3$/hr, the $CO_2$ purity of product gas was 98.5% by volume, the recovery of the product was 45.7%, and the amount of the product obtained was 13.01 $Nm^3$/hr.

EXAMPLE 3

The process of Example 2 was repeated except for changing the adsorption and desorption temperatures from about 26° C. to about 15° C. The results were as follows:

| | |
| --- | --- |
| Supplied amount of starting gas mixture: | 100 $Nm^3$/hr |
| $CO_2$ purity of product gas: | 99.9% by volume |
| Recovery of product: | 42.9% |
| Amount of product obtained: | 12 $Nm^3$/hr |

COMPARATIVE EXAMPLE 2

The process of Example 2 was repeated except for changing the adsorption and desorption temperatures from about 26° C. to about 10° C. The results were as follows:

| | |
| --- | --- |
| Supplied amount of starting gas mixture: | 100 $Nm^3$/hr |
| $CO_2$ purity of product gas: | 99.9% by volume |
| Recovery of product: | 36.4% |
| Amount of product obtained: | 10.2 $Nm^3$/hr |

As mentioned above, the carbon dioxide component can be obtained in high recovery with high purity even if a starting gas mixture having a high dew point is used, since the moisture in the gas mixture is removed with cooling and the moisture-removed gas mixture is again heated to the adsorption temperature, prior to the adsorption of carbon dioxide in the gas mixture.

What is claimed is:

1. A process for adsorbing and separating carbon dioxide from a gas mixture by a pressure-swing adsorption and separation method comprising adsorbing a carbon dioxide component on an adsorbent from a gas mixture having a higher dew point, purging the adsorbent zone with a purge gas, and desorbing the carbon dioxide, characterized in that prior to supplying the gas mixture to the adsorbent moisture in the gas mixture is removed with cooling so as to make the dew point 5° to 20° C. under atmospheric pressure, and the gas mixture from which the moisture has been removed by cooling is heated prior to being supplied to the adsorbent.

2. A process according to claim 1, wherein the gas mixture supplied to the moisture removal with cooling is subjected to a pressure of from atmospheric pressure to 1 $Kg/cm^2$ G.

3. A process according to claim 1, wherein the moisture-removed gas mixture is heated to the adsorption temperature of carbon dioxide.

4. A process according to claim 1, wherein the moisture-removed gas mixture is heated to a temperature of 5° to 30° C. higher than the dew point of the gas mixture at atmospheric pressure.

5. A process according to claim 1, wherein the adsorption is carried out at a pressure of from atmospheric pressure to 1 $Kg/cm^2$ G.

6. A process according to claim 1, wherein the desorption is carried out at a pressure of 50 Torr or higher.

7. A process according to claim 1, wherein the purge gas is a portion of desorbed carbon dioxide.

8. A process according to claim 7, wherein the moisture in the purge gas is removed with cooling so as to make the dew point 5° to 40° C. under atmospheric pressure.

* * * * *